US012420396B2

(12) United States Patent
Suarez

(10) Patent No.: US 12,420,396 B2
(45) Date of Patent: Sep. 23, 2025

(54) POWERED FASTENER DRIVER

(71) Applicant: TECHTRONIC CORDLESS GP, Anderson, SC (US)

(72) Inventor: Joseph Manuel Suarez, Anderson, SC (US)

(73) Assignee: Techtronic Cordless GP, Anderson, SC (US)

(*) Notice: Subject to any disclaimer, the term of this patent is extended or adjusted under 35 U.S.C. 154(b) by 82 days.

(21) Appl. No.: 18/326,757

(22) Filed: May 31, 2023

(65) Prior Publication Data

US 2023/0390909 A1 Dec. 7, 2023

Related U.S. Application Data

(60) Provisional application No. 63/347,923, filed on Jun. 1, 2022.

(51) Int. Cl.

*B25C 7/00* (2006.01)
*B25C 1/04* (2006.01)
(Continued)

(52) U.S. Cl.

CPC ................ *B25C 7/00* (2013.01); *B25C 1/047* (2013.01); *B25C 1/06* (2013.01); *F21V 23/0442* (2013.01); *F21V 33/008* (2013.01)

(58) Field of Classification Search

CPC ......... B25C 1/008; B25C 1/06; B25C 1/0047; B25C 7/00; F21V 33/0084; F21V 33/008; F21V 23/0442; F21Y 2115/10

See application file for complete search history.

(56) References Cited

U.S. PATENT DOCUMENTS 9,533,408 B2 1/2017 Forster et al.
9,943,952 B2 4/2018 Kato
(Continued)

FOREIGN PATENT DOCUMENTS

CN 201124372 Y 10/2008
CN 201361856 Y 12/2009
(Continued)

OTHER PUBLICATIONS

Translation of JP 2012236251 A (Year: 2012).*
(Continued)

*Primary Examiner* — Thomas M Wittenschlaeger
(74) *Attorney, Agent, or Firm* — Michael Best & Friedrich LLP

(57) ABSTRACT

A powered fastener driver includes a driver blade, a lifter, a nose piece, a magazine, and a light. The driver blade is configured to be movable between a top-dead center position and a bottom-dead center position. The lifter is operable to move the driver blade from the bottom-dead center position toward the top-dead center position. The drier blade is extendable through the nose piece when moving from the top-dead center position to the bottom-dead center position. The magazine is configured to transfer individual fasteners into the nose piece. The magazine has a front side configured to face the workpiece during driving of the fastener, an opposite rear side, and a lateral side extending between the front side and the rear side. The light is positioned adjacent the lateral side of the magazine closer to the front side than the rear side.

16 Claims, 7 Drawing Sheets

(51) Int. Cl.

| | |
|---|---|
| ***B25C 1/06*** | (2006.01) |
| ***F21V 23/04*** | (2006.01) |
| ***F21V 33/00*** | (2006.01) |

(56) References Cited

U.S. PATENT DOCUMENTS

| | | | | |
|---|---|---|---|---|
| 10,131,047 | B2 | 11/2018 | Yanagihara et al. | |
| 10,272,553 | B2 | 4/2019 | Yang et al. | |
| 10,286,534 | B2 | 5/2019 | Kato | |
| 10,328,555 | B2 | 6/2019 | Franz et al. | |
| 10,780,567 | B2 | 9/2020 | Wong et al. | |
| 10,967,492 | B2 | 4/2021 | Ferris et al. | |
| 11,141,849 | B2 | 10/2021 | Ferris et al. | |
| 11,480,330 | B2 | 10/2022 | Ishikawa | |
| 2010/0116863 | A1 | 5/2010 | Suda | |
| 2010/0237126 | A1* | 9/2010 | Matsunaga | B25C 1/08 227/8 |
| 2012/0205420 | A1* | 8/2012 | Miyata | B25C 1/08 227/10 |
| 2014/0088753 | A1 | 3/2014 | Lim et al. | |
| 2018/0178361 | A1 | 6/2018 | Kabbes et al. | |
| 2019/0130708 | A1 | 5/2019 | Suzuki et al. | |
| 2020/0269404 | A1 | 8/2020 | Tanaka | |
| 2021/0299837 | A1* | 9/2021 | Garces | B25C 1/06 |
| 2022/0001521 | A1 | 1/2022 | Ferris et al. | |

FOREIGN PATENT DOCUMENTS

| | | | |
|---|---|---|---|
| CN | 201685227 | U | 12/2010 |
| CN | 101628404 | B | 6/2011 |
| CN | 203779460 | U | 8/2014 |
| CN | 105881452 | A | 8/2016 |
| CN | 212947607 | U | 4/2021 |
| CN | 213411874 | U | 6/2021 |
| EP | 2786844 | A1 | 10/2014 |
| JP | 2012236251 | A * | 12/2012 |
| WO | 2021242305 | A1 | 12/2021 |

OTHER PUBLICATIONS

Extended European Search Report for Application No. 23176456.4 dated Mar. 22, 2024 (10 pages).

Third Party Observation submitted in European Application No. 23176456.4 dated May 30, 2025 (3 pages).

* cited by examiner

POWERED FASTENER DRIVER

CROSS-REFERENCE TO RELATED APPLICATIONS

This application claims priority to U.S. Provisional Patent Application No. 63/347,923 filed on Jun. 1, 2022, the entire content of which is incorporated herein by reference.

FIELD OF THE DISCLOSURE

The present disclosure relates to powered fastener drivers, and more specifically to lights for use with powered fastener drivers.

BACKGROUND OF THE DISCLOSURE

There are various fastener drivers known in the art for driving fasteners (e.g., nails, tacks, staples, etc.) into a workpiece. Occasionally, fastener drivers are used in confined spaces or other conditions where light is limited. It may be desirable for a user to see a nose piece of the fastener driver and the workpiece. Better illumination at the nose piece of the fastener driver greatly improves the ability to position a fastener with pinpoint accuracy. Known fastener driver lights can cast shadows that obstruct visibility of the nose piece over the work surface. Thus, a user has decreased ability to see where on the work surface the fastener will be inserted.

SUMMARY OF THE DISCLOSURE

The present disclosure provides, in one aspect, a powered fastener driver. The powered fastener driver may include a driver blade, a lifter, a nose piece, a magazine, and a light. The driver blade is configured to be movable between a top-dead center position and a bottom-dead center position. The lifter is operable to move the driver blade from the bottom-dead center position toward the top-dead center position. The driver blade is extendable through the nose piece when moving from top-dead center to the bottom-dead center position. The magazine is configured to transfer individual fasteners into the nose piece, the magazine having a front side configured to face the workpiece during driving of the fastener, a rear side opposite the front side, and a lateral side. The light is positioned adjacent the lateral side of the magazine closer to the front side than the rear side.

The present disclosure provides, in another aspect, a powered fastener driver. The powered fastener driver may include a driver blade, a lifter, a nose piece, a magazine, and a light. The driver blade is configured to be movable between a top-dead center position and a bottom-dead center position. The lifter is operable to move the driver blade from the bottom-dead center portion toward the top-dead center position. The driver blade is extendable through the nose piece when moving from the top-dead center position to the bottom-dead center position. The magazine is configured to pass the fastener into alignment with the driver blade. The magazine has a front side configured to face the workpiece during driving of the fastener, an opposite rear side, and a lateral side extending between the front side and the rear side. The light is positioned adjacent the lateral side and the front side of the magazine. The light is configured to direct light toward the nose piece and the workpiece.

The present disclosure provides, in another aspect, a powered fastener driver. The powered fastener driver may include a driver blade, a lifter, a nose piece, a magazine, a sensor, a controller, and a light. The driver blade is configured to be movable between a top-dead center position and a bottom-dead center position. The lifter is operable to move the driver blade from the bottom-dead center position toward the top-dead center position. The driver blade is extendable through the nose piece when moving from the top-dead center position to the bottom-dead center position. The magazine is configured to transfer individual fasteners into the nose piece. The magazine has a front side configured to face the workpiece during driving of the fastener, an opposite rear side, and a lateral side extending between the front side and the rear side. The controller is configured to receive a signal from the sensor in response to an event. The light is coupled to the controller and is configured to direct light toward the nose piece and the workpiece. The light is operable by the controller to be actuated in a pattern in response to the event. The light is positioned adjacent the lateral side of the magazine.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
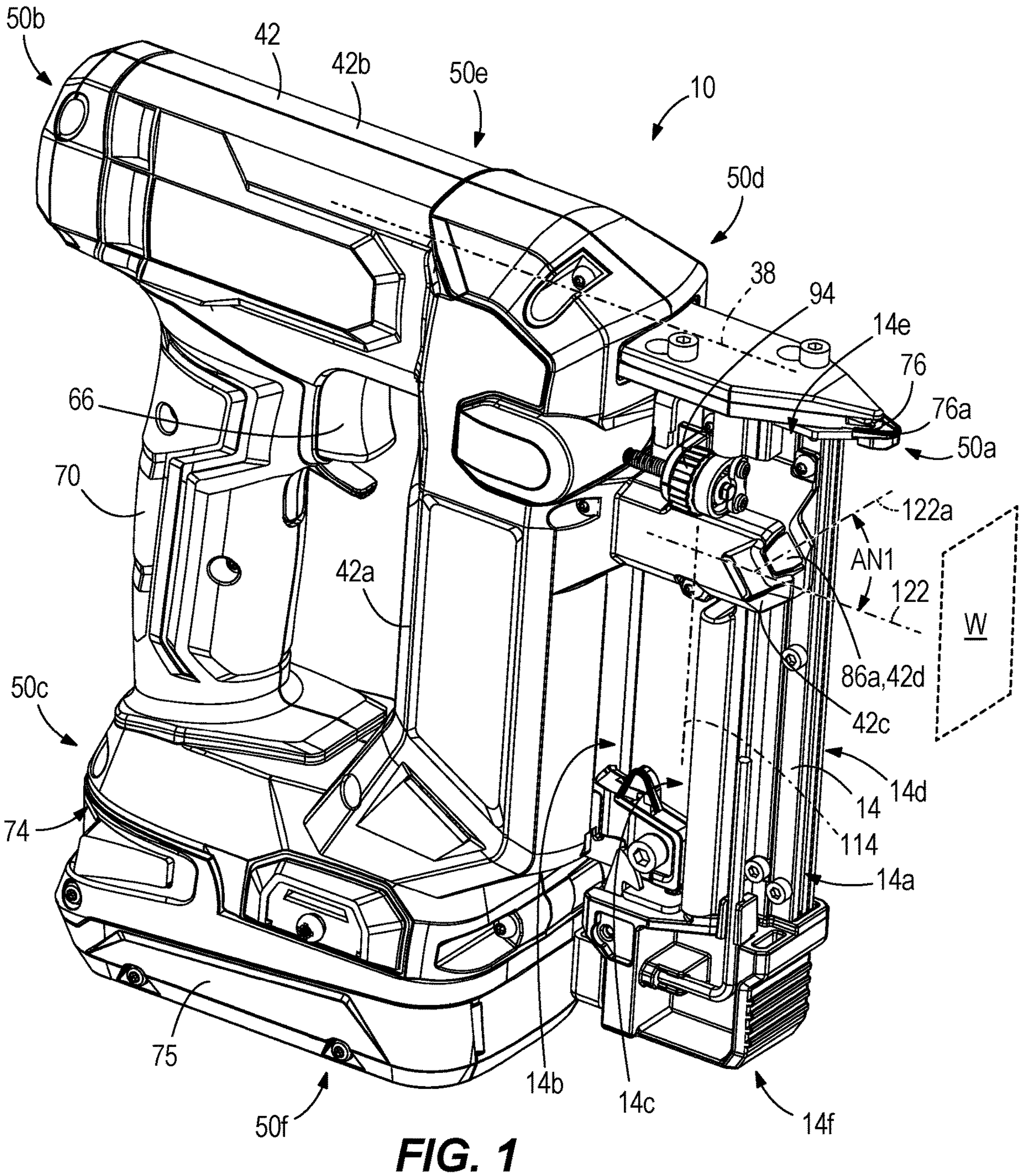
FIG. 1 is a perspective view of a gas spring-powered fastener driver.
Figure 2:
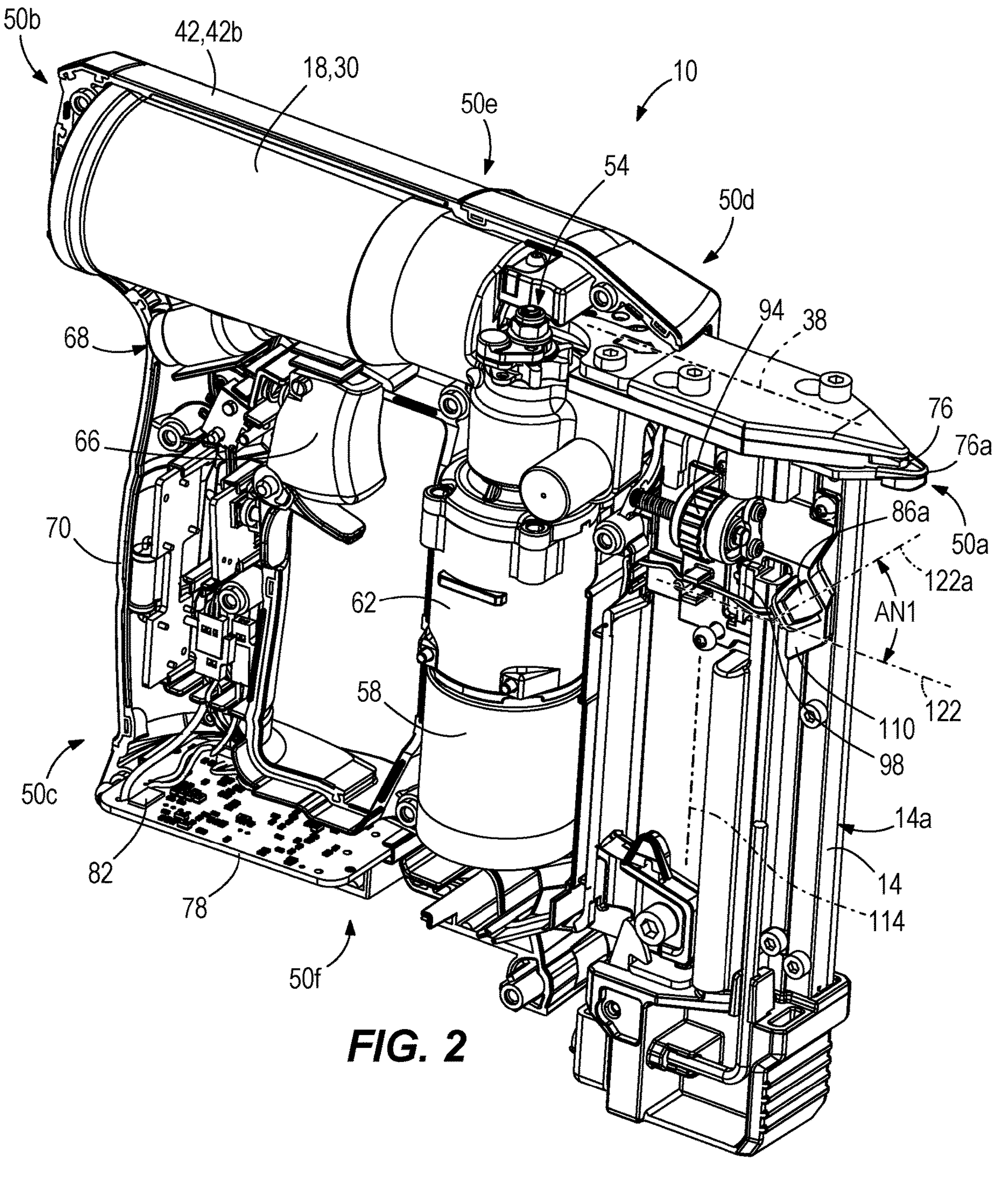
FIG. 2 is a perspective view of the gas spring-powered fastener driver of FIG. 1 with a portion of a housing removed.
Figure 3:
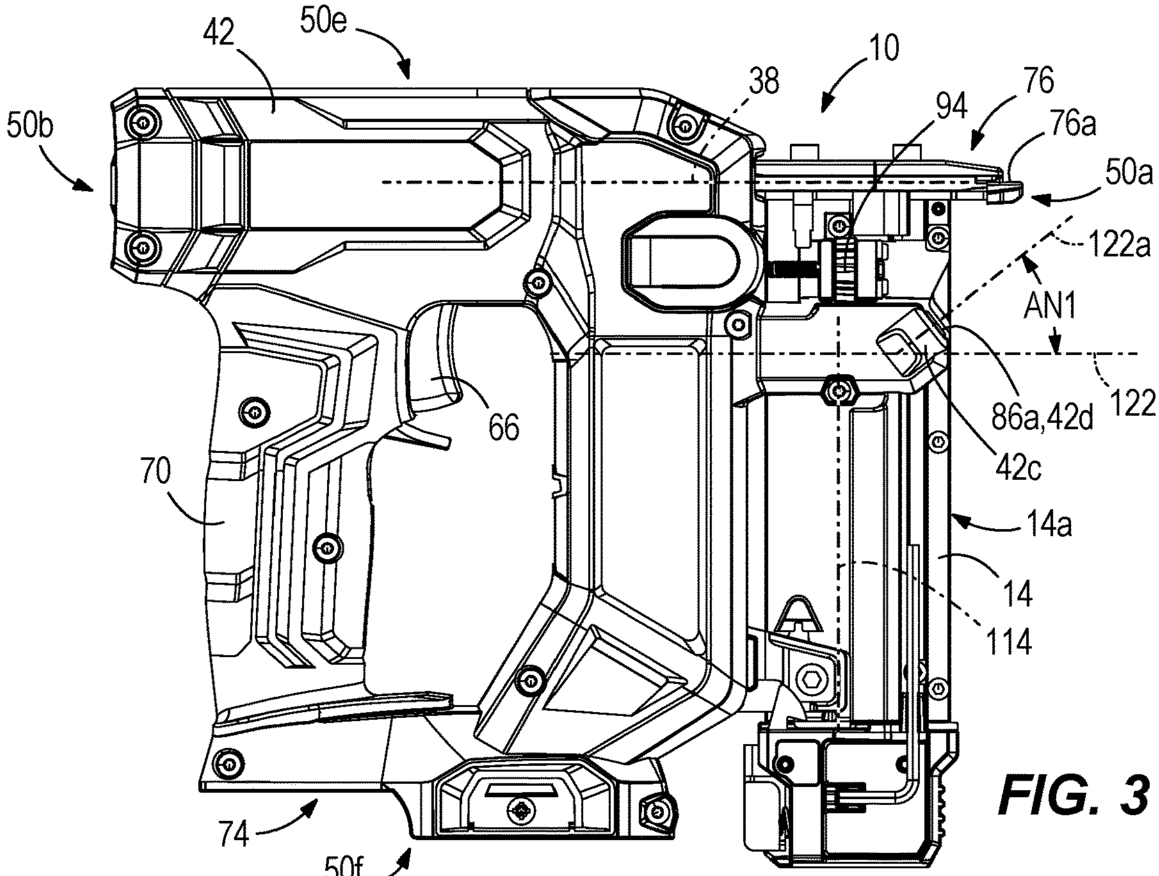
FIG. 3 is a side view of the gas spring-powered fastener driver of FIG. 1.
Figure 4:
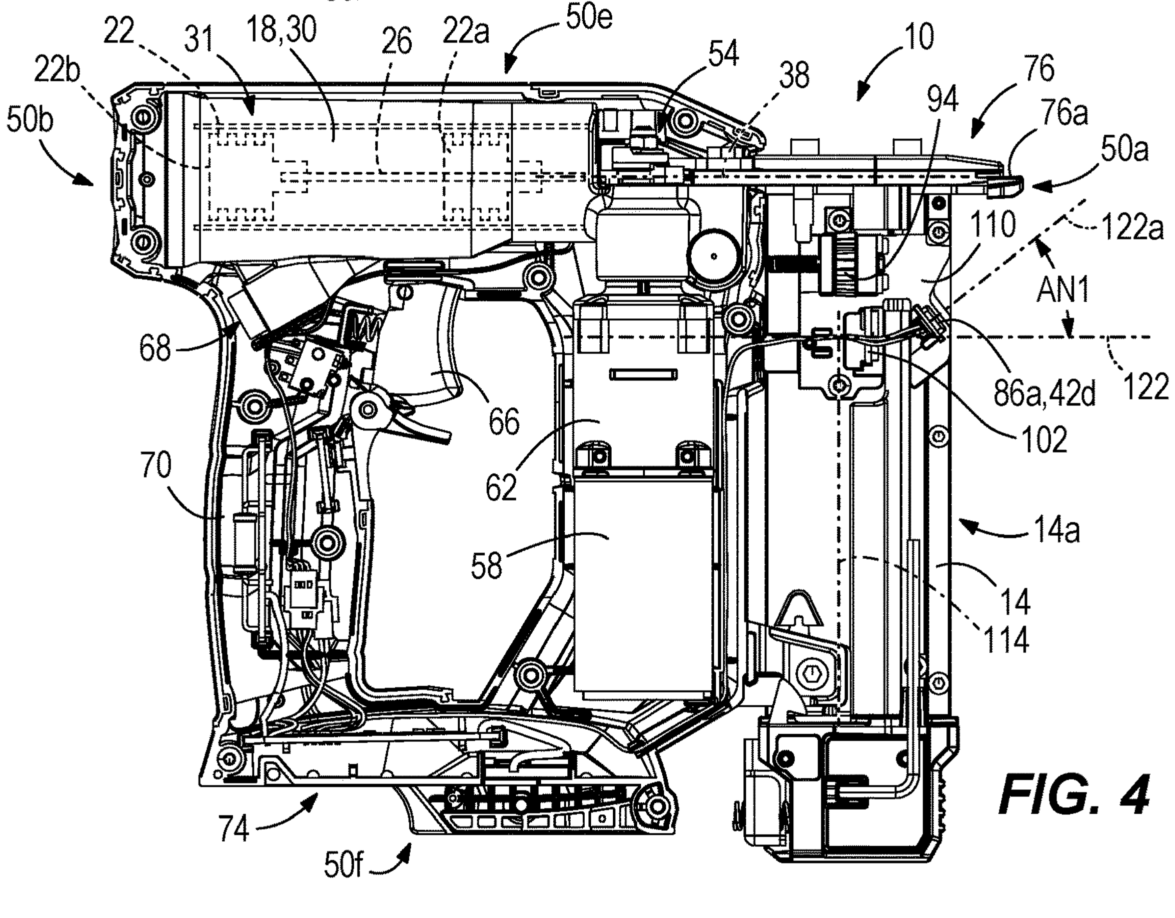
FIG. 4 is a side view of the gas spring-powered fastener driver of FIG. 1 with a portion of the housing removed.

With reference to FIGS. 1-4, a gas spring-powered fastener driver 10 is operable to drive (e.g., nails, tacks, staples, etc.) held within a magazine 14 into a workpiece W. FIG. 2 illustrates some of the internal components of the fastener driver 10. The fastener driver 10 may include a piston cylinder 18 and a moveable drive piston 22 (FIG. 4) positioned within the piston cylinder 18 (FIG. 2). The fastener driver 10 may further include a driver blade 26 that is attached to the piston 22 and moveable therewith. The fastener driver 10 may include an outer storage chamber cylinder 30 of pressurized gas in communication with the piston cylinder 18. The outer storage chamber cylinder 30 defines a storage chamber 31 (FIG. 4) in which compressed gas is stored. The storage chamber 31 is in fluid communication with the piston cylinder 18. In the illustrated embodiment, the storage chamber cylinder 30 is coaxial with the piston cylinder 18, the piston 22, and the driver blade 26 along a driving axis 38. The piston 22 and thus the driver blade 26 are movable along the driving axis 38 between a bottom-dead-center (i.e., BDC) position (illustrated with piston 22*a*, FIG. 4) and a top-dead-center (i.e., TDC) position (illustrated with piston 22*b*, FIG. 4).

The illustrated fastener driver 10 may be a gas-spring powered fastener driver 10. Other similar pneumatic or otherwise powered fastener drivers 10 are possible. The gas spring powered fastener driver 10 may include a housing 42 within which the outer storage chamber cylinder 30 may be positioned. FIG. 1 illustrates the housing 42. The housing includes a motor portion 42*a*, a piston cylinder portion 42*b*, and a compartment 42*c*. The compartment 42*c* extends from the motor portion 42*a*. The fastener driver 10 has a working side 50*a* (i.e., a front side) and an opposite distal side 50*b* (i.e., a rear side). The fastener driver 10 has a first lateral side 50*c* (i.e., a right side) and an opposite second lateral side 50*d* (i.e., a left side). The fastener driver 10 has a first vertical side 50*e* (i.e., a top side) and an opposite second vertical side 50*f* (i.e., a bottom side). In the illustrated embodiment, the above-described first lateral side 50*c* is a right side of the fastener driver 10, and the above-described second lateral side 50*d* is a left side of the fastener driver 10. In the illustrated embodiment, the above-described first vertical side 50*e* may be described as a top side of the fastener driver 10, and the second vertical side 50*f* may be described as a bottom side of the fastener driver 10.

The magazine 14 also includes a working side 14*a* (i.e., front side) closest to the working side 50*a* of the fastener driver 10 and an opposite distal side 14*b* (i.e., rear side) closest to the distal side 50*b* of the fastener driver 10. Accordingly, during use (e.g., driving of fastener[s]) of the fastener driver 10, the working side 14*a* (i.e., front side) of the magazine 14 may face at least the nose piece 76. In typical operation, the working side 14*a* (i.e., front side) of the magazine 14 will also face the work contact tip 76*a* and the workpiece W. However, other embodiments not including the work contact tip 76*a* are possible, and the geometry and dimensions workpiece W may differ. The working side 14*a* may be referred to as a front side of the magazine 14. The magazine 14 also includes a first lateral side 14*c* (i.e., a right side) and an opposite second lateral side 14*d* (i.e., a left side). The first lateral side 14*c* (i.e., the right side) of the magazine 14 is positioned adjacent to the first lateral side 50*c* (i.e., the right side) of the fastener driver 10. The second lateral side 14*d* (i.e., the left side) of the magazine 14 is positioned adjacent to the second lateral side 50*d* (i.e., the left side) of the fastener driver 10. The magazine 14 also includes a first end 14*e* (i.e., a top side) proximal to a lifting assembly 54 and an opposite second end 14*f* (i.e., a bottom side) adjacent the second vertical side 50*f* (i.e., the bottom side) of the fastener driver 10. The sides of the fastener driver 10 and magazine 14 are described in a single orientation relative to the workpiece W- with the working (i.e., front) sides thereof 50*a*, 14*a* facing the workpiece W. However, the fastener driver 10 and magazine 14 may be oriented in various orientations during normal use of the fastener driver 10.

With reference to FIG. 2, the piston cylinder 18 and the driver blade 26 define a driving axis 38. The piston cylinder 18 is positioned within the piston cylinder portion 42*b* of the housing 42. During a driving cycle, the driver blade 26 and the piston 22 may be movable between the top-dead-center (i.e., TDC) position (piston 22*b*, FIG. 4) and a driven or bottom-dead-center (BDC) position (piston 22*a*, FIG. 4). The fastener driver 10 further includes the above-mentioned lifting assembly 54 (FIGS. 2, 4), which is powered by a motor 58, and which is operable to move the driver blade 26 from the driven position to the TDC position (piston 22*b*, FIG. 4). As illustrated in the illustrated embodiment of FIG. 4, a gearbox 62 may be positioned between the motor 58 and the lifting assembly 54. In other embodiments, the gearbox 62 can be circumvented, with the motor 58 being directly coupled to the lifting assembly 54. The motor 58 is positioned within the motor portion 42*a* of the housing 42.

In operation, the lifting assembly 54 may drive the piston 22 and the driver blade 26 toward the TDC position by energizing the motor 58. As the piston 22 and the driver blade 26 are driven toward the TDC position, the gas above the piston 22 and the gas within the storage chamber cylinder 30 may be compressed. Prior to reaching the TDC position, the motor 58 may be deactivated and the piston 22 and the driver blade 26 are held in a ready position, which is located between the TDC and the BDC or driven positions, until being released by user activation of a trigger 66 (FIG. 1). When released, the compressed gas above the piston 22 and within the storage chamber cylinder 30 may drive the piston 22 and the driver blade 26 to the driven position, thereby driving a fastener into the workpiece. The illustrated fastener driver 10 therefore operates on a gas spring principle utilizing the lifting assembly 54 and the piston 22 to further compress the gas within the piston cylinder 18 and the storage chamber cylinder 30. While being driven, the driver blade 26 is extendable through a nose piece 76 when moving from top-dead center to the bottom-dead center position. After a fastener is ejected from the nose piece 76, the magazine 14 transfers another individual fastener into the nose piece 76. Further detail regarding the structure and operation of the fastener driver 10 is provided below. The fastener driver 10 of FIG. 2 may include a fill port 68 configured to receive external gas and pass external gas into the storage chamber cylinder 30 (and thereby, the storage chamber 31).

With continued reference to FIG. 2, the piston cylinder 18 and the outer storage chamber cylinder 30 may both extend generally along the driving axis 38. Adjacent the distal side 50*b*, the housing 42 may include a handle 70 extending generally perpendicularly from the working axis 38 between the first vertical side 50*e* and the second vertical side 50*f*. A battery receptacle 74 may be provided at a distal side of the handle 70 positioned furthest from a work contact tip 76*a* of a nose piece 76- the work contact tip 76*a* contacting the workpiece W. The battery receptacle 74 may be configured to receive a battery pack 75 (FIG. 1) therein for coupling the battery pack 75 to the motor 58. The battery pack 75 may also be coupled to a tool printed circuit board 78. The tool printed circuit board 78 has an on-board controller 82. In other embodiments, the fastener driver 10 may be a corded power tool and the battery receptacle 74 may be omitted.

The controller 82 may be configured to operate (e.g., actuate, selectively dim, turn ON and OFF) a light 86*a*. In some embodiments (e.g., FIG. 5), the light 86*a* may include one or more light emitting diodes (LEDs) 86*b* or other light emitting elements 86*b* mounted on a printed circuit board 86*c*. In other embodiments, the light 86*a* may include one or more light emitting diodes (LED) 86*b* or other light emitting element 86*b* wired to a power source without a printed circuit board 86*c*. The light 86*a* may be adjacent to a light transparent window 42*d* of the housing 42 such that the light transparent window 42*d* shields the light 86*a* from debris external to the fastener driver 10 while permitting passage of light emitted by the light emitting element 86*b* therethrough. The transparent window 42*d* may allow rays of light emitted by the light emitting element 86*b* to pass therethrough without further direction by the transparent window 42*d*. Alternatively, the transparent window 42*d* may function as a lens to further direct rays of light emitted by the light emitting element 86*b* towards the nose piece 76 and the workpiece W. The light 86*a* may be positioned on the first lateral side 14*c* of the magazine 14 closer to the working side 14*a* than the distal side 14*b* of the magazine 14. More specifically, the light 86*a* may be positioned on the first lateral side 14*c* of the magazine 14 adjacent the working side 14*a*. In the illustrated embodiment, the light 86*a* is positioned at the working side 14*a* of the magazine 14. Accordingly, rays of light emitted when the light 86*a* emits light extend along the driving axis in a direction extending from the distal side 50*b* and beyond the working side 50*a*. In the illustrated embodiment, a lens 90 (FIG. 1) may cover at least a portion of the light 86*a*. The lens may be a total internal reflection (TIR) lens. Other types of lenses are possible. The lens 90 may direct rays of light emitted by the light 86*a* towards the nose piece 76 and the workpiece W. The lens 90 may be positioned within the light transparent window 42*d* of the housing 42 such that the lens 90 is shielded from debris by the light transparent window 42*d*.

With continued reference to FIGS. 1 and 2, the powered fastener driver 10 may further include a depth of drive (e.g., DOD) assembly 94. The depth of drive assembly 94 may be configured to receive user input (e.g., rotation) such that a user may adjust a depth of driving of a fastener into the workpiece W dependent on working conditions (e.g., the type of fastener, the density of the workpiece W). The depth of drive assembly 94 may be positioned closer to the first vertical side 50*e* when compared to the light 86. The depth of drive assembly 94 may be positioned on the magazine 14. More specifically, the depth of drive assembly 94 may be user-operable from the same lateral side (e.g., the first lateral side 50*c*) of the fastener driver 10 when compared to the light 86. Other arrangements are possible.

Figure 5:
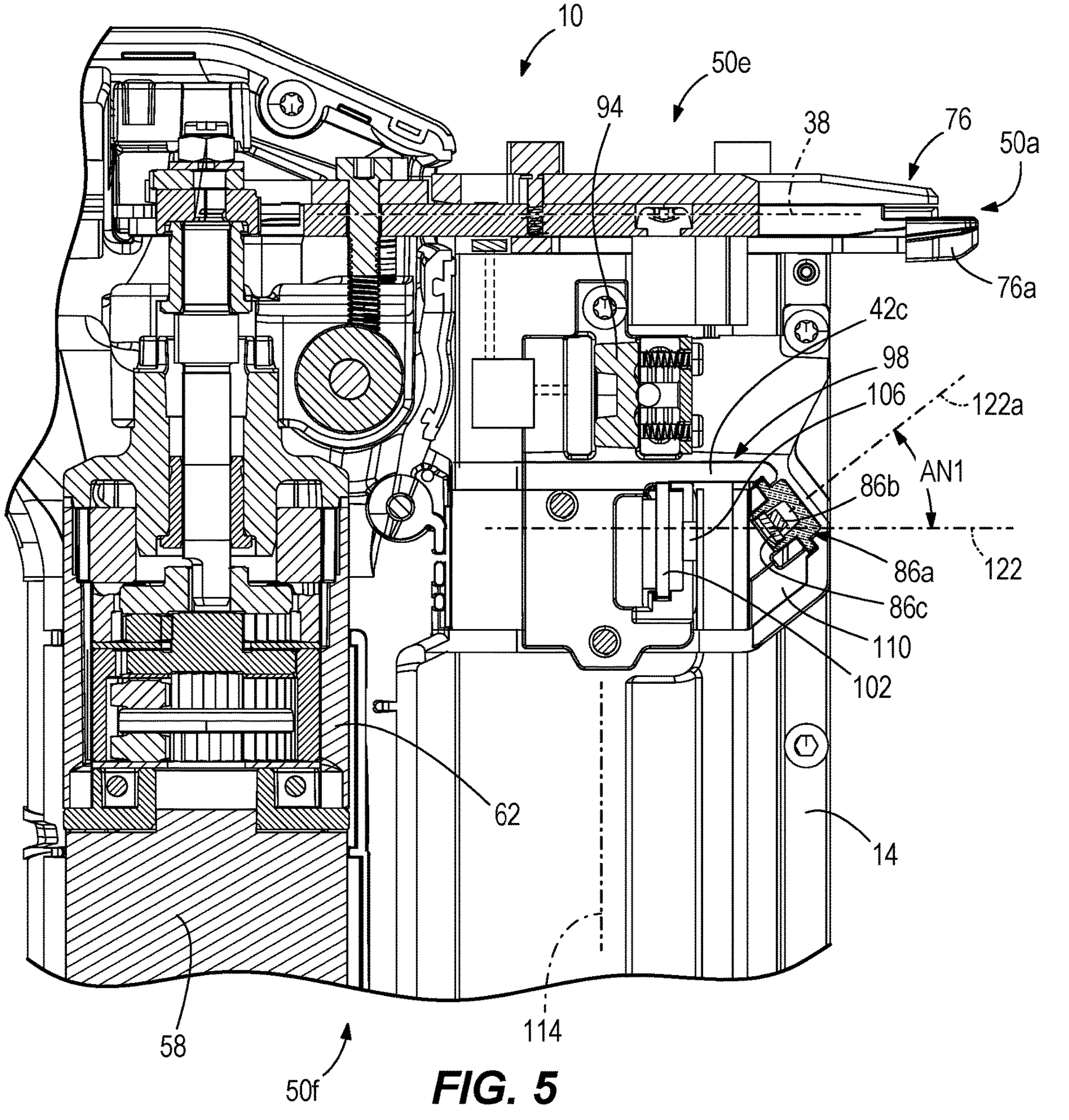
FIG. 5 is a cross-sectional view of a portion of the gas spring-powered fastener driver of FIG. 1.

With reference to FIGS. 1 and 2, the fastener driver 10 may further includes a dry fire lockout mechanism 98. The dry fire lockout mechanism 98 is positioned within the compartment 42*c* adjacent the first lateral side (i.e., the right side) of the magazine 14. The compartment 42*c* is positioned laterally outboard of the magazine 14. In other embodiments, the compartment 42*c* and thus the dry fire lockout mechanism 98 may be positioned adjacent the second lateral side (i.e., the left side) of the magazine 14. The illustrated dry fire lockout mechanism 98 (FIG. 2) may include a dry fire printed circuit board 102 and a hall effect sensor 106. Other types of sensors may function adequately to perform the duties of the dry fire lockout mechanism 98. The hall effect sensor 106 may be mounted upon the dry fire printed circuit board 102. The dry fire printed circuit board 102 and thus the hall effect sensor 106 are electrically coupled to the controller 82. The hall effect sensor 106 may be configured to generate a signal and report the signal to the controller 82 in response to a main pusher 110 of the magazine 14 reaching a position corresponding to an empty state of the magazine 14 in which no fasteners are positioned within the magazine. The main pusher 110 may be magnetic and/or include a magnet mounted thereto. As illustrated in FIG. 5, the main pusher 110 is movable along a magazine axis 114. The main pusher 110 feeds fasteners into alignment with the driver blade 26 for driving the fastener into the workpiece W. The magazine axis 114 is generally perpendicular to the driving axis 38.

Figure 6:
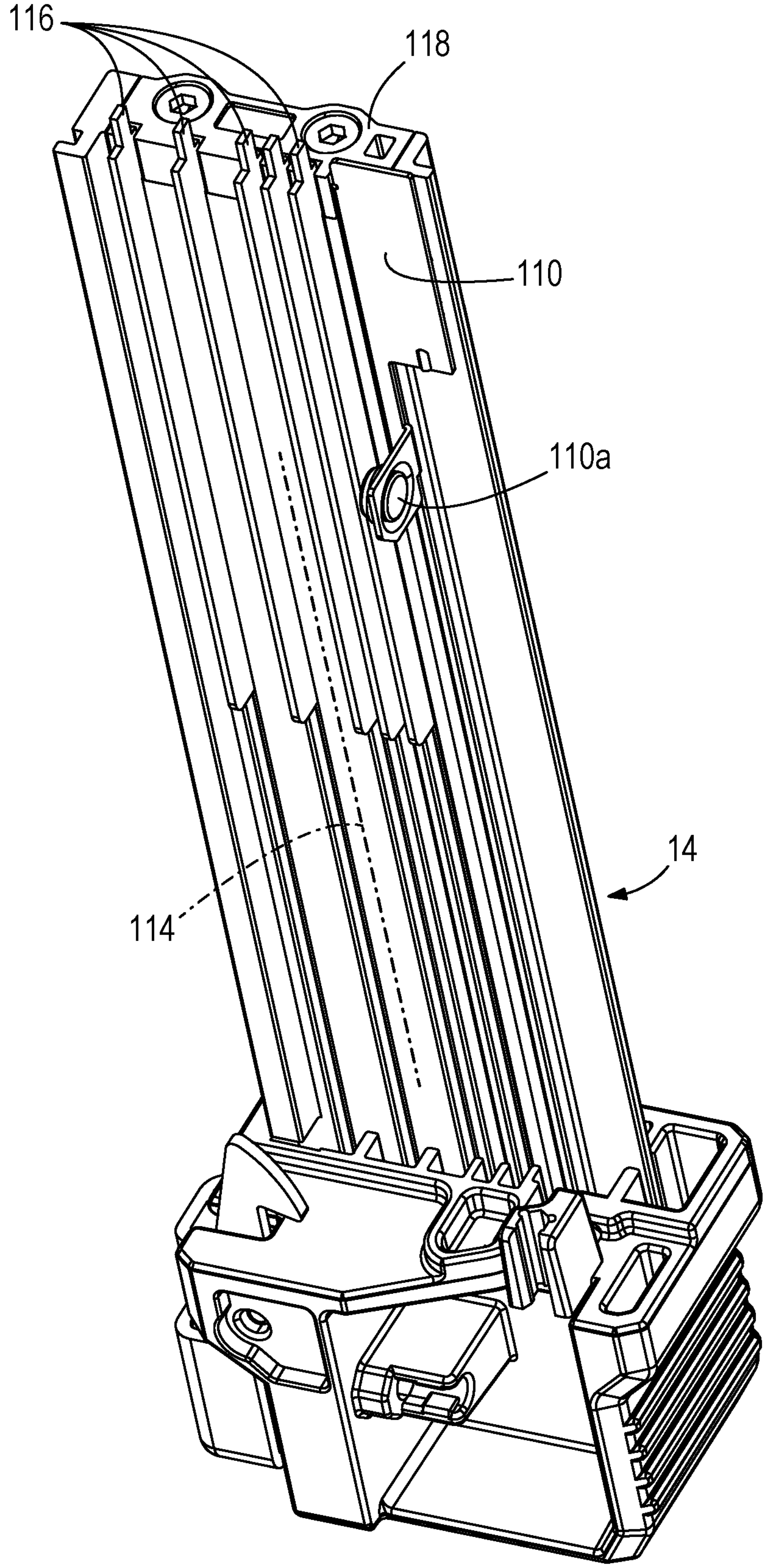
FIG. 6 is a perspective view of a main pusher of the gas spring-powered fastener driver of FIG. 1.

The main pusher 110 is more clearly illustrated in FIG. 6. The main pusher 110 may include a magnet 110*a* which operates along with the hall effect sensor 106 to generate the signal indicative of the empty state of the magazine 14. A plurality of small pushers 116 may operate along with the main pusher 110 to push the fasteners into alignment with the driver blade 26, and thus the lifting assembly 54. The fasteners may be biased into alignment with the driver blade 26 by a spring 118. The spring 118 may press against the magazine 14.

Returning to the embodiment illustrated in FIG. 5, the dry fire lockout mechanism 98 may be aligned with the light 86*a* along a light axis 122. The compartment 42*c* extends parallel to the light axis 122. The light axis 122 extends in a direction generally parallel to the driving axis 38 and between the working side 50*a* and the distal side 50*b*. In other words, the dry fire lockout mechanism 98 is provided at the same height as the light 86. The dry fire lockout mechanism 98 is provided closer to the distal side 50*b* when compared to the light 86. The dry fire lockout mechanism 98 is provided on the same lateral side (e.g., the right side) of the fastener driver 10 as the light 86.

The light 86*a* is positioned at least partially in the compartment 42*c* adjacent the first lateral side (i.e., the right side) of the magazine 14. As mentioned above, the compartment 42*c* may be adjacent the second lateral side (i.e., the left side) of the magazine 14. The light 86*a* is capable of emitting light in a direction forward of the compartment 42*c* (i.e., through the transparent aforementioned light transparent window 42*d*). In a front-rear direction, the light 86*a* may be positioned closer to the working side 14*a* (i.e., front side) of the magazine 14 than the distal side 14*b* (i.e., rear side) of the magazine 14. In some embodiments, the light 86*a* may be positioned at least partially in-line with the working side 14*a* (i.e., front side) of the magazine 14. In other embodiments, the light 86*a* may be positioned between the working side 14*a* (i.e., front side) and the distal side 14*b* (i.e., rear side). As such, rays of light emitted by the light 86*a* reduce the size and amount of shadow(s) cast at an interface of where the fastener will enter the workpiece W as the fastener exits the nose piece 76. The aforementioned position of the light 86*a* is directly related to minimizing obstructions between the light 86*a* and a point at which the fastener will exit the nose piece 76.

Figure 7:
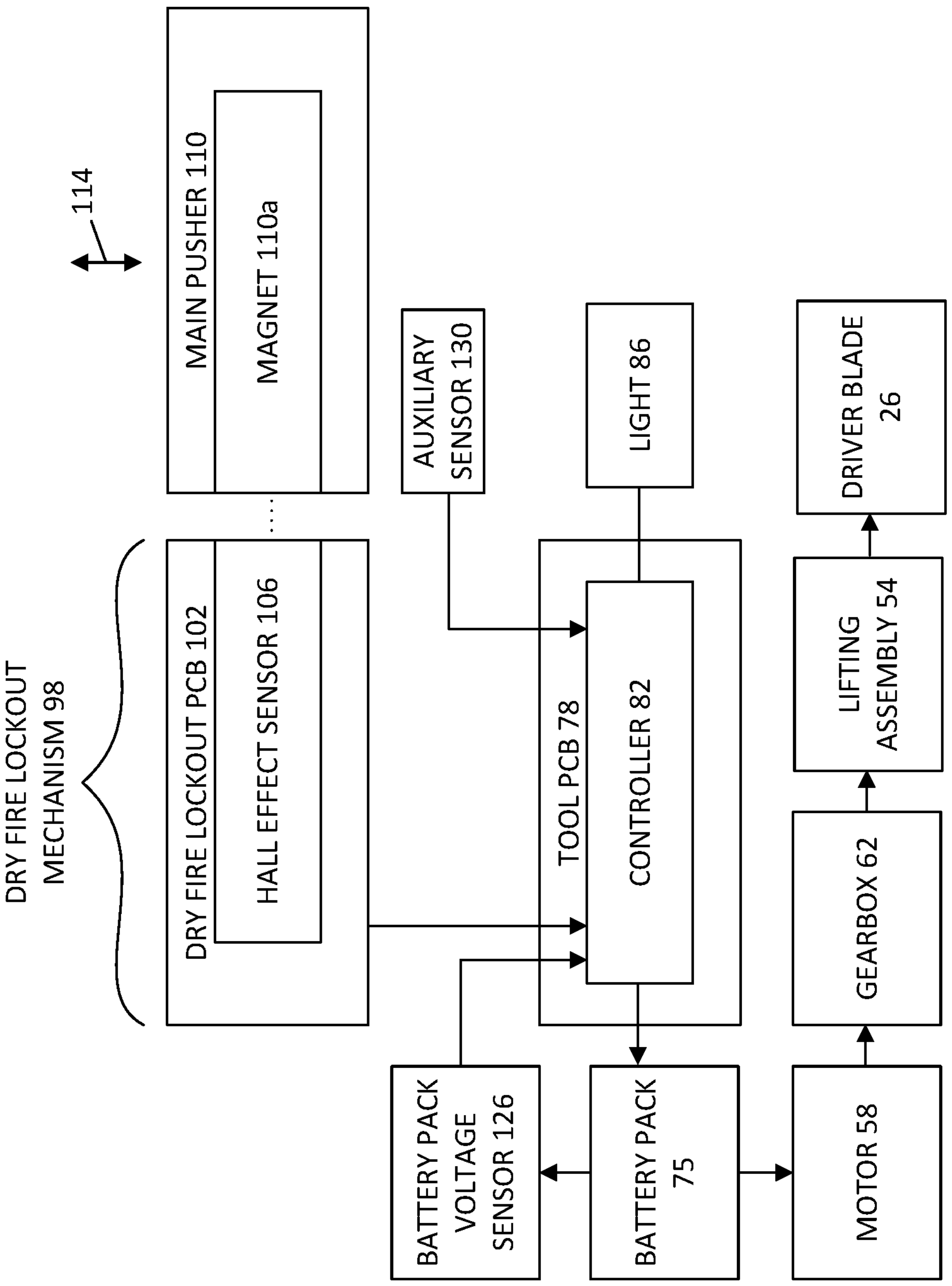
FIG. 7 is a schematic view of the gas spring-powered fastener driver of FIG. 1.

With reference to FIG. 7, the controller 82 may be configured to actuate the light in response to input from the dry fire lockout mechanism 98, a battery pack voltage sensor 126, and/or an auxiliary sensor 130. The dry fire lockout mechanism 98 may send a signal to the controller 82 upon detecting that no fasteners remain in the magazine 14. The battery pack voltage sensor 126 may send a signal to the controller 82 upon detection that the battery pack 75 is operating at a non-ideal voltage below a threshold voltage of the battery pack 75. The auxiliary sensor 130 may be any other sensor configured to monitor operation of the various components of the powered fastener driver 10 (e.g., the motor 58, the gearbox 62, pressure within the outer storage chamber cylinder 30 and/or the storage chamber 31, etc.). The auxiliary sensor 130 may send a signal to the controller 82 upon detection that the powered fastener driver 10 is not operating correctly (e.g., generic tool operation error, jam of a fastener, gears of the gearbox 62 being out of sync, etc.).

The controller 82, in turn, may actuate (e.g., turn ON and OFF) the light 86*a* based on the input from the dry fire lockout mechanism 98, the battery pack voltage sensor 126, and/or the auxiliary sensor 130. In the illustrated embodiment, the controller 82 may cycle the light 86*a* between an ON condition in which the light 86*a* emits rays of light and an OFF condition in which the light does not emit rays of light. In the ON condition, the rays of light shine upon the at least one of the nose piece 76 and the workpiece W. In the illustrated embodiment, a time that the light is on (e.g., ON TIME 134) and a time that the light is off (e.g., OFF TIME 138) are similar in response to each of the inputs from the dry fire lockout mechanism 98, the battery pack voltage sensor 126, and/or the auxiliary sensor 130. However, other arrangements in which the ON TIME 134 and the OFF TIME 138 are different are possible.

As illustrated in the Table below, the controller 82 may actuate the light 86*a* based on a variety of codes C1-C3. In other words, the controller 82 is programmed with a plurality of patterns for actuating the light 86*a* in response to any one of a plurality of events sensed by any of the dry fire lockout mechanism 98, the battery pack voltage sensor 126, and/or the auxiliary sensor 130. When the dry fire lockout mechanism 98 sends the signal to the controller 82, a code C3 is followed. The controller 82 receives the code C3 and actuates the light a blink count number BC3 in accordance with the code. The exemplary blink count BC3 is four. Blink count BC3 represents four cycles of the light 86*a* between the ON condition and the OFF condition. While cycling through the ON condition and the OFF condition, the ON TIME 134 and OFF TIME 138 of the code C3 are followed. In the illustrated embodiment, the ON TIME 134 and the OFF TIME 138 are each 200 milliseconds (ms). Other timings are possible. The battery pack voltage sensor 126, and/or the auxiliary sensor 130 operate along the same principles, but having differing blink counts (BC1-BC2) as well as different ON TIMEs 134 and OFF TIMEs 138 as enumerated in the Table below. The actual ON TIME 134 and OFF TIME 138 may be ±5% of the stated ON TIME 134 and OFF TIME 138 to allow for error in clock timing of the controller 82. Other amounts of clock timing error may are envisioned.

TABLE

| Code | Blink Count | ON TIME 134 | OFF TIME 138 |
|---|---|---|---|
| Protective Lockout (C1) | 120 (BC1) | 1,000 ms | 1,000 ms |
| Low Battery Voltage (C2) | ≈19-20 (BC2) | 500 ms | 500 ms |
| Dry Fire Lockout (C3) | 4 (BC3) | 200 ms | 200 ms |

The aforementioned examples relating to actuation of the light 86*a* relate to instances (i.e., codes C1-C2) where the controller 82 may cause the fastener driver 10 not to cycle (e.g., fire) upon activation of the trigger 66. In other words, the aforementioned examples relate to actuation of the light 86*a* where the controller 82 inhibits driving of the driver blade 26 from its top-dead center position toward its bottom-dead center position. However, the controller 82 may actuate (e.g., turn ON and OFF) the light 86*a* based on any instance (i.e., code) in which the fastener driver 10 is still capable of cycling (e.g., firing) upon activation of the trigger 66. For example, other instances (i.e., codes) may include but are not limited to the fastener driver 10 being in an increased power level mode, a reduced power level mode, and the like. In the increased power level mode, for example, pressure within the storage chamber 31 may be above a desired pressure but less than an unsafe pressure. Instances other than raised pressure may also cause the fastener driver 10 to be placed in the increased power level mode. In the decreased power level mode, for example, pressure within the storage chamber 31 may be below a desired pressure but greater than an unusable pressure (at which fasteners may not enter the workpiece W to a desired depth). Instances other than lowered pressure may also cause the fastener driver 10 to be placed in the reduced power level mode. As such, the light 86*a* may notify the user about the mode in which the tool will operate by the flashes that the light 86*a* provides. In some instances, the actuation of the light 86*a* corresponding with when the fastener driver 10 is still capable of cycling (e.g., firing) may be initiated (e.g., started) upon activation of at least one or both of the nose piece 76 with the workpiece W and the trigger 66. In other instances, actuation of the light to indicate any instance (i.e., code) in which the fastener driver 10 is still capable of cycling (e.g., firing) may be initiated when the instance (e.g., raised or lowered pressure in the storage chamber 31) is sensed (e.g., by the auxiliary sensor 130). The light 86*a* may also be operated in modes corresponding with different types of usable but undesired values such as, without limitation, usable but not desired voltage supplied by the battery pack 75.

Figure 8:
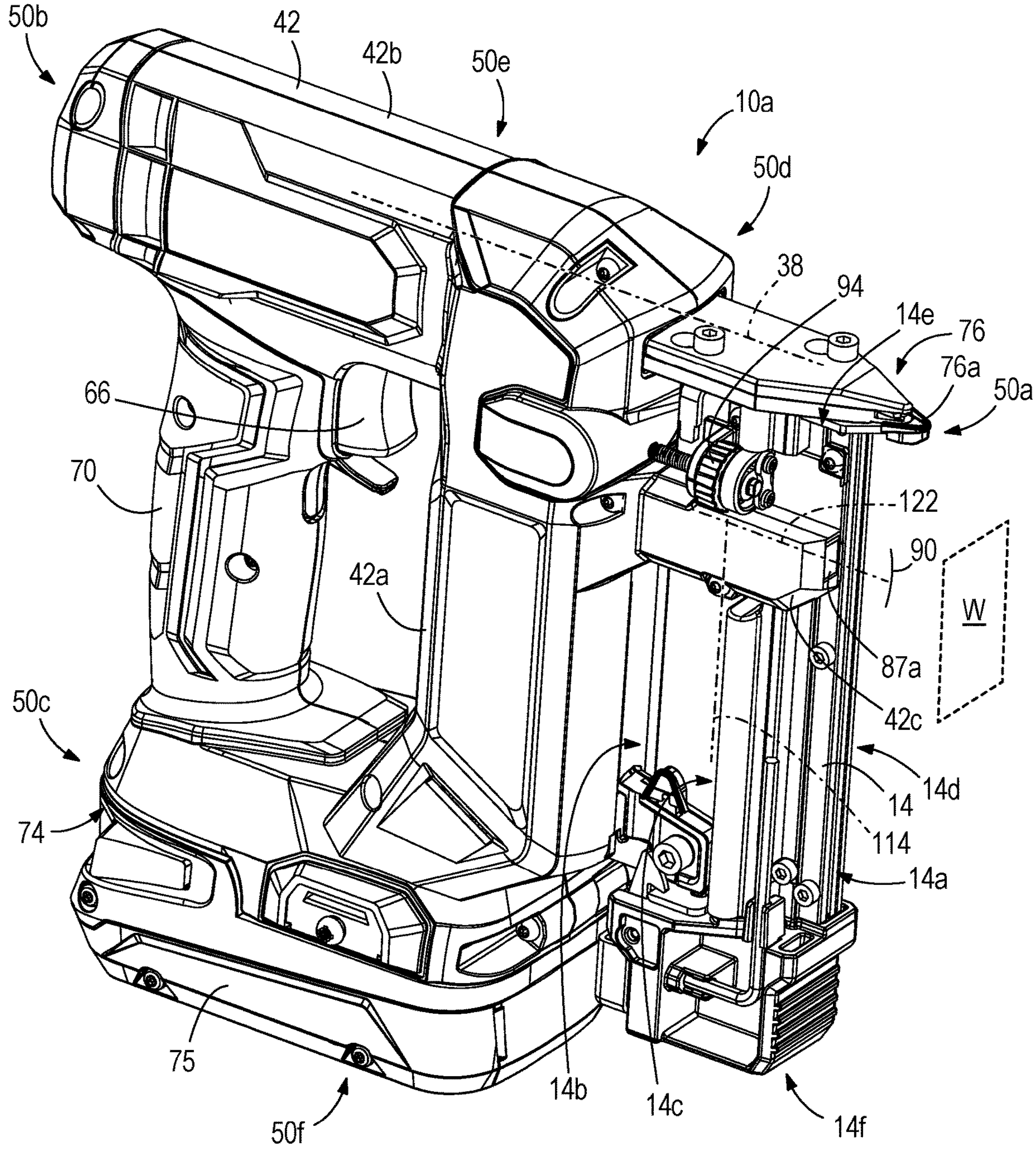
FIG. 8 is a perspective view of another gas spring-powered fastener driver.

FIGS. 1-5 illustrate a fastener driver 10 with a light 86*a* mounted at least partially in the compartment 42*c* and adjacent the magazine 14 with the light 86*a* oriented to project light along an auxiliary light axis 122*a* in a direction towards the nose piece 76 and workpiece W. The auxiliary light axis 122*a* is transverse to the above-described light axis 122. The auxiliary light axis 122*a* permits the light 86*a* to directly shine upon the nose piece 76 and the workpiece W without requiring a lens 90, such as the lens 90 described above in the fastener driver 10. However, a lens 90 may be applied to the light 86*a* to further redirect the rays emitted by the light 86*a*. The auxiliary light axis 122*a* may be angled relative to the above-described light axis 122 an angle AN1 (FIG. 5). The angle AN1 is measured between the auxiliary light axis 122*a* and the light axis 122 in a plane parallel to an intersecting plane of the driving axis 38 and the magazine axis 114. In the illustrated embodiment, the angle AN1 is approximately 37 degrees. In other embodiments, the angle AN1 may be greater than 0 degrees and less than 90 degrees. In other embodiments, the angle AN1 may be equal to or greater than 30 degrees and equal to or less than 60 degrees. The angle AN1 may be equal to or greater than 30 degrees and equal to or less than 45 degrees. As illustrated in FIG. 8, alternate fastener drivers 10*a* similar to the fastener driver 10 may include lights 87*a* positioned at least partially within the compartment 42*c*, adjacent to the magazine 14, and oriented generally parallel to the light axis 122 (i.e., the angle AN1 may be approximately 0 degrees in some embodiments). One or both of the aforementioned lens 90 or the light transparent window 42*d* may be configured to direct light emitted by the light 87*a* towards the nose piece 76 (e.g., adjacent the work contact tip 76*a*) and the workpiece W.

Although the disclosure has been described in detail with reference to certain preferred embodiments, variations and modifications exist within the scope and spirit of one or more independent aspects of the disclosure as described.

Various features of the disclosure are set forth in the following claims.

What is claimed is:

1. A powered fastener driver configured to drive a fastener into a workpiece, the powered fastener driver comprising:

a driver blade configured to be movable between a top-dead center position and a bottom-dead center position;

a lifter operable to move the driver blade from the bottom-dead center position toward the top-dead center position;

a nose piece through which the driver blade is extendable when moving from the top-dead center position to the bottom-dead center position;

a magazine configured to transfer individual fasteners into the nose piece, the magazine having a front side configured to face the workpiece during driving of the fastener, an opposite rear side, and a lateral side extending between the front side and the rear side;

a light positioned adjacent the lateral side of the magazine between the front side and the rear side and closer to the front side than the rear side;

a housing including a compartment within which the light is at least partially positioned, wherein the compartment of the housing is positioned laterally outboard of the magazine; and a dry fire lockout mechanism at least partially positioned within the compartment.

2. The powered fastener driver of claim 1, further comprising a lens covering at least a portion of the light.

3. The powered fastener driver of claim 1, wherein the light is positioned at least partially within a compartment extending along a light axis in a direction parallel to a driving axis of the driver blade, and wherein the light is mounted adjacent the magazine extending along an auxiliary light axis angled relative to the light axis.

4. The powered fastener driver of claim 3, wherein the auxiliary light axis is angled relative to the light axis by greater than 0 degrees and lesser than 90 degrees.

5. The powered fastener driver of claim 1, wherein rays of light emitted by the light are directed to minimize a shadow cast on the workpiece aligned with a driving axis of the driver blade.

6. The powered fastener driver of claim 1, wherein the powered fastener driver is a gas spring powered fastener driver including a piston coupled to the driver blade and movable within a piston cylinder, the powered fastener driver further comprising a storage chamber in which compressed gas is stored, the storage chamber being in fluid communication with the piston cylinder, the powered fastener driver further comprising a fill port configured to receive external gas and pass external gas into the storage chamber.

7. The powered fastener driver of claim 6, wherein the lateral side is a right side of the magazine.

8. A powered fastener driver configured to drive a fastener into a workpiece, the powered fastener driver comprising:

a driver blade configured to be movable between a top-dead center position and a bottom-dead center position;

a lifter operable to move the driver blade the bottom-dead center position toward the top-dead center position;

a nose piece through which the driver blade is extendable when moving from the top-dead center position to the bottom-dead center position;

a magazine configured to transfer individual fasteners into the nose piece, the magazine having a front side configured to face the workpiece during driving of the fastener, an opposite rear side, and a lateral side extending between the front side and the rear side;

a sensor;

a controller configured to receive a signal from the sensor in response to an event; and a light coupled to the controller and configured to direct light toward the nose piece and the workpiece, the light being operable by the controller to be actuated in a pattern in response to the event, wherein the light is positioned adjacent the lateral side of the magazine between the front side and the rear side and closer to the front side than the rear side, and wherein the sensor comprises a dry fire lockout mechanism which monitors for an empty state of a magazine in which no fasteners are positioned within the magazine, and wherein the pattern is indicative of the empty state of the magazine.

9. The powered fastener driver of claim 8, further comprising a housing including a compartment, wherein the light is positioned at least partially within the compartment.

10. The powered fastener driver of claim 8, wherein in response to receiving the signal indicative of the event, the controller inhibits driving of the driver blade from the top-dead center position toward the bottom-dead center position.

11. The powered fastener driver of claim 8, wherein the event is one of a plurality of events, the pattern is one of a plurality of patterns, and wherein the controller is configured to actuate the light in each one of the plurality of patterns to indicate a corresponding one of the plurality of events.

12. The powered fastener driver of claim 8, further comprising a battery pack in electrical communication with the controller, wherein the sensor comprises a battery pack voltage sensor which monitors for non-ideal voltage below a threshold voltage of the battery pack, the pattern being indicative of the non-ideal voltage.

13. The powered fastener driver of claim 8, wherein the powered fastener driver is a gas spring powered fastener driver including a piston coupled to the driver blade and movable within a piston cylinder, the powered fastener driver further comprising a storage chamber in which compressed gas is stored, the storage chamber being in fluid communication with the piston cylinder, wherein the sensor comprises a pressure sensor which monitors for raised or lowered pressure in the storage chamber, the pattern being indicative of the raised pressure or the lowered pressure.

14. A powered fastener driver configured to drive a fastener into a workpiece, the powered fastener driver comprising:

a driver blade configured to be movable between a top-dead center position and a bottom-dead center position;

a lifter operable to move the driver blade the bottom-dead center position toward the top-dead center position;

a nose piece through which the driver blade is extendable when moving from the top-dead center position to the bottom-dead center position;

a magazine configured to transfer individual fasteners into the nose piece, the magazine having a front side configured to face the workpiece during driving of the fastener, an opposite rear side, and a lateral side extending between the front side and the rear side;

a sensor;

a controller configured to receive a signal from the sensor in response to an event; and a light coupled to the controller and configured to direct light toward the nose piece and the workpiece, the light being operable by the controller to be actuated in a pattern in response to the event, wherein the light is positioned adjacent the lateral side of the magazine between the front side and the rear side and closer to the front side than the rear side, and wherein the powered fastener driver is a gas spring powered fastener driver including a piston coupled to the driver blade and movable within a piston cylinder, the powered fastener driver further comprising a storage chamber in which compressed gas is stored, the storage chamber being in fluid communication with the piston cylinder, wherein the sensor comprises a pressure sensor which monitors for raised or lowered pressure in the storage chamber, the pattern being indicative of the raised pressure or the lowered pressure.

15. The powered fastener driver of claim 14, wherein in response to receiving the signal indicative of the event, the controller inhibits driving of the driver blade from the top-dead center position toward the bottom-dead center position.

16. The powered fastener driver of claim 14, further comprising a battery pack in electrical communication with the controller, wherein the sensor comprises a battery pack voltage sensor which monitors for non-ideal voltage below a threshold voltage of the battery pack, the pattern being indicative of the non-ideal voltage.

* * * * *